W. A. SCOTT.
BOLT LOCK.
APPLICATION FILED OCT. 26, 1910.
986,510.
Patented Mar. 14, 1911.
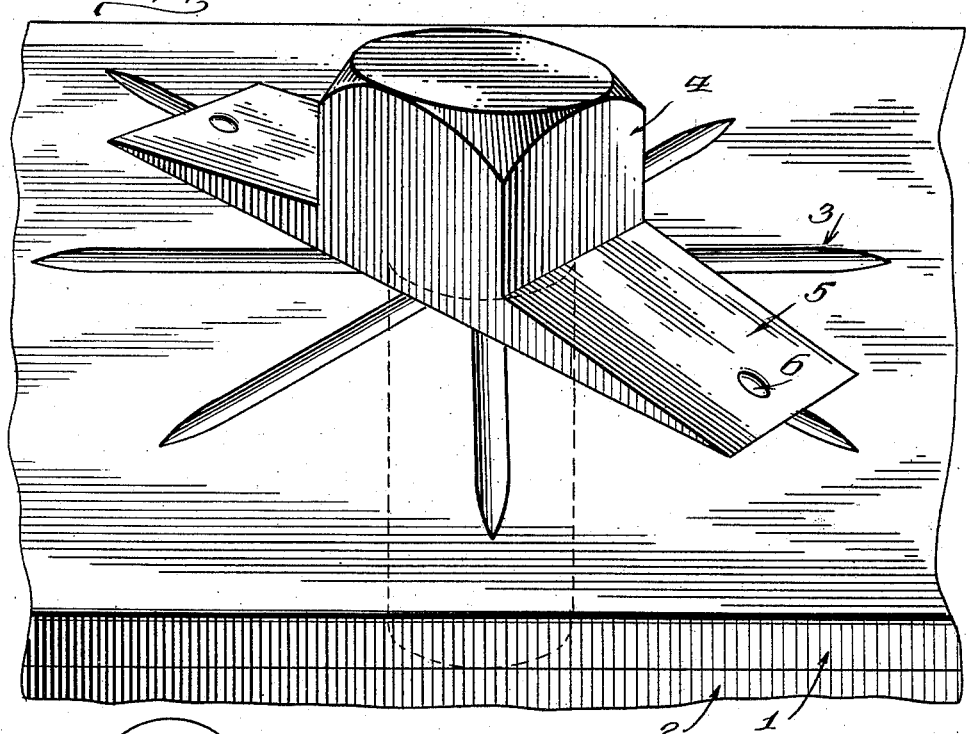
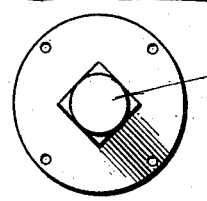
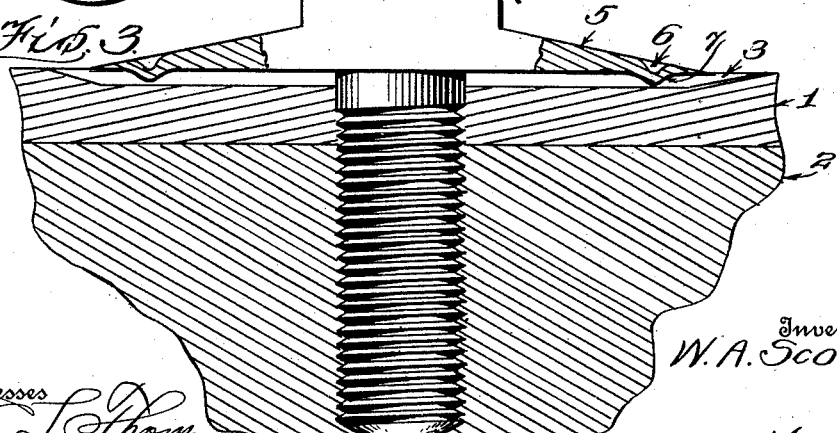

UNITED STATES PATENT OFFICE.

WILLIAM A. SCOTT, OF LIVINGSTON, MONTANA, ASSIGNOR OF ONE SIXTY-FOURTH TO L. F. LINCOLN, OF LIVINGSTON, MONTANA.

BOLT-LOCK.

986,510.

Specification of Letters Patent.

Patented Mar. 14, 1911.

Application filed October 26, 1910. Serial No. 589,194.

*To all whom it may concern:*

Be it known that I, WILLIAM A. SCOTT, a citizen of the United States, residing at Livingston, in the county of Park and State of Montana, have invented certain new and useful Improvements in Bolt-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to bolt and nut lock and has for its object to provide a simple way of maintaining a positively locked position of a bolt, nut or the like.

Other objects will be apparent from the following specification and appended claims, in which:—

Figure 1 is a perspective view of the device. Fig. 2 is a sectional view, the bolt being shown in elevation, and Fig. 3 is a plan of a modified form.

Referring specifically to the drawings, 1 designates a plate secured to the base 2, 3 a plurality of radial grooves formed in the plate 1 and 4 indicates a bolt having the usual shank portion and head of the common type. Extending laterally from opposite sides of said head are resilient leaves or flanges 5 which are indented as at 6, forming bosses 7 which engage in the grooves 3.

The operation of my device is as follows:—The bolt or nut, having the form of the standard type except for the resilient flanges with indentures therein, and the radially grooved surface presented to said flanges and indentures, is applied as the common type and, when completely screwed into the part to receive it, the indentures in extensions engage one or another of said radial grooves. As shown by the modified form, circular or any symmetrically shaped flange may be used in place of the laterally extending flanges.

What I claim to be new is:—

1. A nut or bolt lock comprising a nut or bolt head, resilient flanges extending therefrom, said flanges being flush with the lower face of said nut or bolt head, bosses adjacent to the ends of said flanges on the under side thereof, and recesses formed in the face of the sub-structure to receive said bosses and secure the bolt against rotation.

2. A nut or bolt lock comprising a nut or bolt head, resilient flanges extending therefrom, said flanges being flush with the underside of said nut or bolt head, to present additional friction bearing surface, bosses struck down in said flanges adjacent to the marginal edge thereof, and a slotted face to receive said bosses when the bolt or nut is applied.

3. A nut or bolt lock comprising a nut or bolt head, resilient flanges extending therefrom and surrounding said nut or bolt head, said flanges tapering from said nut or bolt head, indentures struck in the upper surface of said flanges near the marginal edge thereof, bosses on the under side of said flanges incident to said indentures, recesses in the face of the sub-structure, the object being to receive said bosses in said recesses to arrest and hold said bolt or nut against accidental movement.

In testimony whereof I hereunto affix my signature in the presence of two witnesses.

WILLIAM A. SCOTT.

Witnesses:
M. C. ALLEN,
J. W. BECKSTROM.

Copies of this patent may be obtained for five cents each, by addressing the "Commissioner of Patents, Washington, D. C."